(12) United States Patent
Schreck et al.

(10) Patent No.: US 7,310,196 B1
(45) Date of Patent: Dec. 18, 2007

(54) PARKING A TRANSDUCER RESPONSIVE TO A PARK SIGNAL

(75) Inventors: Erhard Schreck, San Jose, CA (US); Robert Jackson, Union City, CA (US); Timothy Glassburn, Milpitas, CA (US); Donald E. Adams, Pleasanton, CA (US)

(73) Assignee: Maxtor Corporation, Longmont, CO (US)

( * ) Notice: Subject to any disclaimer, the term of this patent is extended or adjusted under 35 U.S.C. 154(b) by 199 days.

(21) Appl. No.: 11/132,534

(22) Filed: May 19, 2005

Related U.S. Application Data (60) Provisional application No. 60/632,379, filed on Dec. 2, 2004.

(51) Int. Cl.
*G11B 21/02* (2006.01)
*G11B 19/02* (2006.01)

(52) U.S. Cl. .................................. 360/75; 360/69
(58) Field of Classification Search ...................... None
See application file for complete search history.

(56) References Cited

U.S. PATENT DOCUMENTS

| | | | |
|---|---|---|---|
| 5,633,568 A * | 5/1997 | Dunfield ..................... | 318/254 |
| 6,452,753 B1 | 9/2002 | Hiller et al. ............. | 360/254.7 |
| 6,480,361 B1 | 11/2002 | Patterson .................. | 360/254.3 |
| 2005/0088773 A1 * | 4/2005 | Yoshida ....................... | 360/75 |
| 2006/0010458 A1 * | 1/2006 | Georgis ...................... | 720/600 |

* cited by examiner

*Primary Examiner*—Andrew L. Sniezek
(74) *Attorney, Agent, or Firm*—Myers Bigel Sibley & Sajovec, P.A.

(57) ABSTRACT

A disk drive includes a rotatable data storage disk, an interface, a transducer, a write buffer, an actuator, and a controller. The transducer is configured to read and write data on the disk. The interface is configured to receive data with associated write commands and a park signal. The write buffer is configured to temporarily store the data and associated write commands while the data waits to be written on the disk via the transducer. The actuator is configured to move the transducer between a parked position and tracks on a disk where data is read and written. The controller is configured to execute the buffered write commands by positioning the transducer relative to tracks on the disk while writing data from the write buffer to the disk, and is configured to respond to the park signal, which is indicative of an imminent transducer to disk contact condition, by moving the transducer to the park position without completing execution of the buffered write commands.

24 Claims, 4 Drawing Sheets

PARKING A TRANSDUCER RESPONSIVE TO A PARK SIGNAL

RELATED APPLICATION

This application claims the benefit of and priority to U.S. Provisional Patent Application No. 60/632,379, filed Dec. 2, 2004, the disclosure of which is hereby incorporated herein by reference as if set forth in its entirety.

FIELD OF THE INVENTION

The present invention generally relates to digital data storage devices and, more particularly, to a disk drive that selectively moves a transducer to a park position relative to a disk therein.

BACKGROUND OF THE INVENTION

Disk drives are digital data storage devices which can enable host computers to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent to surfaces of the disks to transfer data between the disks and a host computer. The transducers can be radially positioned over the disks by a rotary actuator and a closed loop, digital servo system, and can fly proximate to the surfaces of the disks upon air bearings.

Because the disks can rotate at a high speed relative to the transducers, contact between a transducer and a data storage area of a disk can cause loss of data, damage to the disk, and/or damage to the transducer. If the transducer is allowed to rest on the data storage area of a non-rotating disk, stiction between the transducer and a viscous layer on the disk can prevent the transducer from resuming a desired fly distance upon spin-up of the disk. Consequently, some disk drives include a ramp apparatus on which the transducer can be parked to prevent contact with the disk. Some other disk drives include a landing zone on the disk that is configured (e.g., textured) to enable a transducer parked thereon to resume flying upon spin-up of the disk.

In response to a shut-down command from a host, some disk drives will complete any queued read/write commands from the host and then park the transducer.

SUMMARY OF THE INVENTION

In some embodiments of the present invention, a disk drive includes a rotatable data storage disk, an interface, a transducer, a write buffer, an actuator, and a controller. The transducer is configured to read and write data on the disk. The interface is configured to receive data with associated write commands and a park signal. The write buffer is configured to temporarily store the data and associated write commands while the data waits to be written on the disk via the transducer. The actuator is configured to move the transducer between a parked position and tracks on a disk where data is read and written. The controller is configured to execute the buffered write commands by positioning the transducer relative to tracks on the disk while writing data from the write buffer to the disk, and is configured to respond to the park signal, which is indicative of an imminent transducer to disk contact condition, by moving the transducer to the park position without completing execution of the buffered write commands.

In some further embodiments, the park signal can indicate that the disk drive has been physically dropped. The controller can respond to that indication by moving the transducer to the park position before data associated with a buffered write command completes being written to the disk. The controller may immediately cease reading and writing of data to the disk and to immediately move the transducer to the park position in response to the park signal. The controller may resume writing data from the write buffer to the disk after the park signal ceases to indicate that the disk drive is being dropped, and/or after expiration of a defined time since the park signal indicated that the disk drive had been dropped. The controller may respond to the park signal through a hardware interrupt that causes operation of the controller to branch to operations that move the transducer to the park position without further writing of data from the write buffer to the disk.

In yet some further embodiments, the park signal can indicate an imminent loss of power to the disk drive. The controller can respond to that indication by the park signal by writing data and associated write commands from the write buffer to at least one temporary storage location on the disk that is different from one or more logical block disk addresses identified by the associated write commands from the host. The controller can complete the writing to the temporary location while preventing another write command from the host from being received and buffered in the write buffer. After writing the contents of the write buffer to the temporary location, the controller can then move the transducer to the park position. The controller may write the data from the write buffer, which is addressed by associated write commands for non-contiguous logical block disk addresses, to contiguous logical block disk addresses at a temporary storage location on the disk. The controller may respond to the park signal through a hardware interrupt. The controller may respond to power-up of the disk drive by moving the data from the at least one temporary storage location on the disk to the one or more logical block disk addresses identified by the associated write commands from the host.

In some other embodiments of the present invention, a host includes an interface that can be communicatively coupled to a disk drive, a central processing unit, and a sensor. The central processing unit is configured to communicate data and associated write commands via a first path through the interface to a coupled disk drive to cause the data to be written through a transducer onto a disk in the disk drive. The sensor is configured to sense a condition that may cause imminent contact between the transducer and the disk in the disk drive, and to generate a park signal that is indicative of the sensed condition and which is communicated via a second path through the interface to the disk drive to cause the disk drive to move the transducer to a park position. The first and second communication paths through the interface can correspond to different electrical communication pins therein.

In some further embodiments, the sensor can include a drop sensor that is configured to determine when the disk drive has been dropped and responsive thereto to generate the park signal to the disk drive. The sensor may alternatively, or additionally, include a power loss sensor that is configured to determine when a condition of imminent loss of power to the disk drive occurs, and responsive thereto to generate the park signal to the disk drive. The host can include an operating system, and the sensor may bypass the operation system when it communicates the park signal through the interface to the disk drive. The sensor may communicate the park signal through a dedicated one or more of electrical conductors of the interface to the disk drive.

DETAILED DESCRIPTION OF THE INVENTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of hosts, disk drives, and controllers according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
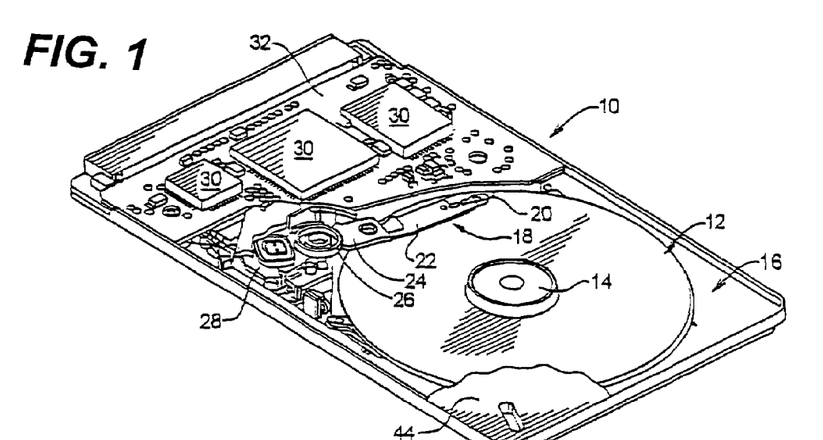
FIG. 1 is a perspective view of a disk drive that is configured in accordance with some embodiments of the present invention.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16.

The actuator arm assembly 18 includes a transducer 20 (or head) mounted to a flexure arm 22 which is attached to an actuator arm 24 that can rotate about a pivot bearing assembly 26. The transducer 20 may comprise an MR element or a TFI element. The actuator arm assembly 18 also includes a voice coil motor (VCM) 28 which moves the transducer 20 relative to the disk stack 12. The spindle motor 14 and actuator arm assembly 18 are coupled to a controller and associated electronic circuits 30 mounted to a printed circuit board 32. The controller 30 may include analog and/or digital circuitry, and typically includes a digital signal processor (DSP), a microprocessor-based controller and a random access memory (RAM) device. As will be explained in more detail below, in accordance with some embodiments of the present invention, the controller 30 is configured to read/write data from the disk stack 12 responsive to commands from a host, and is configured to move the transducer 20 to a park location in response to a host generated park signal that is indicative of an imminent transducer to disk contact condition.

Figure 2:
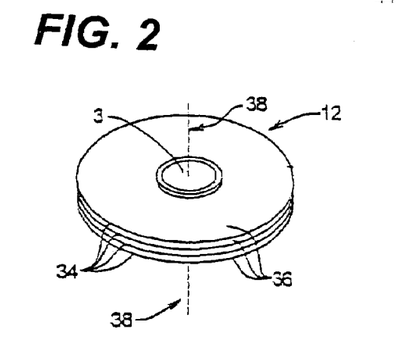
FIG. 2 is a block diagram of a disk stack having a plurality of data storage disks.

Referring now to the illustration of FIG. 2, the disk stack 12 typically includes a plurality of disks 34, each of which may have a pair of disk surfaces 36, 36. The disks 34 are mounted on a cylindrical shaft and are configured to rotate about axis 38. The spindle motor 14 as mentioned above, rotates the disk stack 12. Although the disks 34 are described as magnetic disks for purposes of illustration, they may alternatively be optical disks or any other type of data storage disk.

Figure 3:
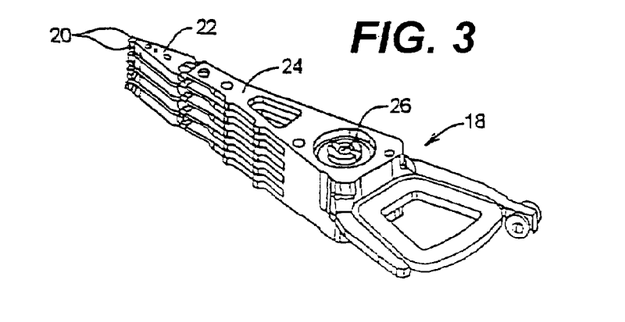
FIG. 3 is a perspective view of a portion of an actuator arm assembly having a plurality of actuator arms.

Referring now to the illustration of FIGS. 1 and 3, the actuator arm assembly 18 includes a plurality of the transducers 20, each of which are adjacent to a different one of the disk surfaces 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36.

Figure 4:
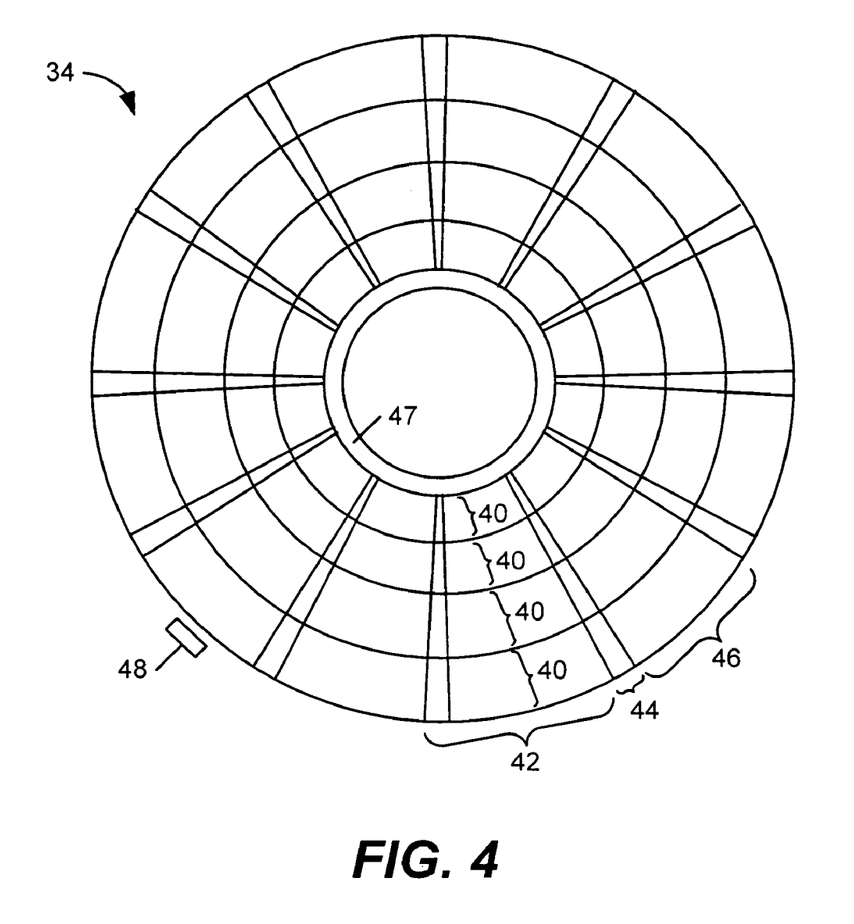
FIG. 4 is a top view of a disk and illustrates a landing zone, a ramp, and tracks and spokes, with each of the spokes being divided into a servo spoke and a data spoke.

FIG. 4 further illustrates one of the disks 34. Data is stored on the disk 34 within a number of concentric tracks 40 (or cylinders). Each track is divided into a plurality of radially extending sectors 42 on the disk 34. Each sector 42 is further divided into a servo region 44 and a data region 46. The servo regions 44 of the disk 34 are used to, among other things, accurately position the transducer 20 so that data can be properly written onto and read from the disk 34. The data regions 46 are where non-servo related data (i.e., user data) is stored and retrieved. Such data, upon proper conditions, may be overwritten. Data can be written to and read from logical block addresses on the disk that are identified by respective write commands and read commands from a host.

FIG. 4 also illustrates a landing zone 47 and a ramp 48 on which the transducer 20 may be parked when the disk drive 10 is deenergized. The landing zone 47 may correspond to, for example, a laser texture zone on each disk surface 36 that includes a laser roughened surface that can reduce stiction of the transducer 20 when parked (e.g., resting) thereon. The ramp 48 may be adjacent to a periphery of each disk 34 and configured to prevent contact between the transducer 20 and the disk 34 when the transducer 20 is parked on the ramp 48, and it may be further configured to secure the transducer 20 thereon until the disk drive 10 is reenergized. The exemplary disk drive 10 has been illustrated as having both a landing zone 47 and a ramp 48, however, it is to be understood that typically only one of the landing zone 47 or the ramp 48 is associated with each transducer 20. Moreover, the ramp 48 may be located adjacent to the inner or outer periphery of the disk 34, and the landing zone 27 may be located anywhere on the surface 36 of the disk 34 without departing from embodiments of the present invention. Representative ramps are provided in U.S. Pat. No. 6,452,753 and U.S. Pat. No. 6,480,361, the disclosures of which are hereby incorporated by reference as if set forth in their entirety.

Some embodiments of the present invention arise from a recognition that some conditions that can cause the transducer 20 to undesirably contact the disk 34 can be predicted by a host. Moreover, these conditions may be predicted with a sufficient lead time so that the host can notify the controller 30 in the disk drive 10 and the transducer 20 can be moved to a parked position before the predicted condition occurs. For example, when the disk drive is dropped, the host may sense the drop and predict a subsequent impact which may cause the transducer 20 to collide with the disk 34, and can cause the controller 30 to attempt to move the transducer 20 to a parked position before the impact. Moreover, the host may sense an indication of a loss of power to the host, and can predict an associated loss of power to the disk drive 10, and can cause the controller 30 to attempt to move the transducer 20 to a parked position before it loses its ability to control such positioning.

Figure 5:
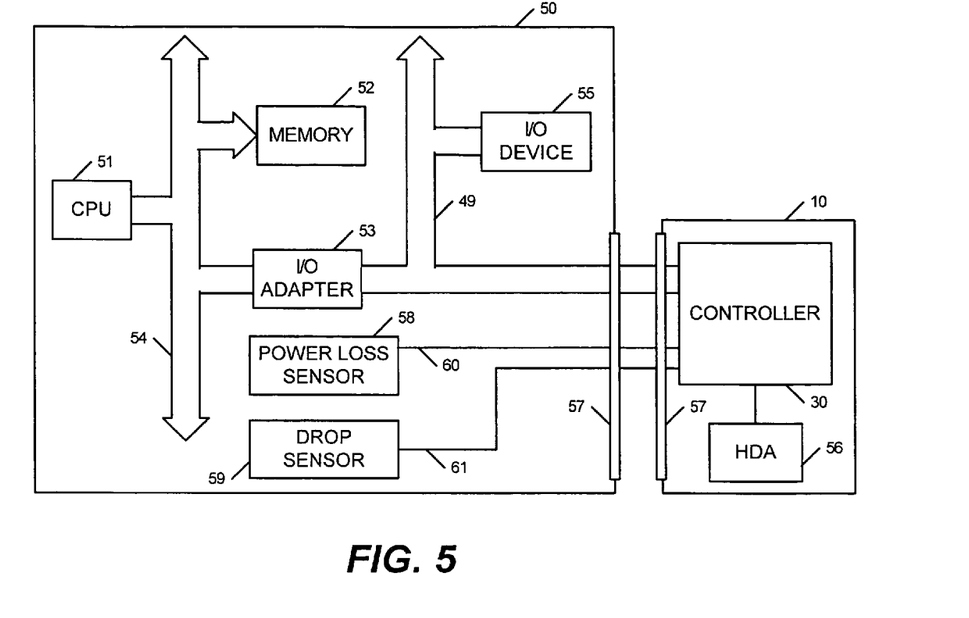
FIG. 5 is a block diagram of a system that includes a host and a disk drive which are configured in accordance with some embodiments of the present invention.

Referring to FIG. 5, a system is illustrated that includes an exemplary host 50 and the disk drive 10. The host 50 may include, but is not limited to, a desktop computer, a laptop computer, a personal digital assistant (PDA), a digital video recorder/player, a digital music recorder/player, and/or another electronic device that can be communicatively coupled to a disk drive.

The host 50 can include a central processing unit ("CPU") 51, a main memory 52, and I/O bus adapter 53, all interconnected by a system bus 54. Coupled to the I/O bus adapter 53 is I/O bus 49, that may be, for example, an ATA bus, SATA bus, small computer system interconnect (SCSI) bus, firewire bus, and/or a universal serial bus. The I/O bus 49 is configured to enable communication among the CPU 51, various peripheral I/O devices 55, and the disk drive 10. The host 50 and disk drive 10 can each include an interface 57 that is configured to be communicatively coupled to one another. The disk drive 10 is illustrated by the controller 30 and a head disk assembly 56 ("HDA") that can include, for example, the actuator arm assembly 18, spindle motor 14, and disk stack 12.

In accordance with some embodiments, the host 50 includes a power loss sensor 58 and a drop sensor 59. The power loss sensor 58 is configured to sense a condition that is indicative of an imminent loss of power to the disk drive 10 with the possible result of undesirable contact between the transducer 20 and a data storage area of the disk 34. In some embodiments, the host 50 is configured to supply power to the disk drive 10 through the interface 57 and/or via another conductive path. The power loss sensor 58 may sense a voltage drop across an input and/or output of a power supply in the host 50, and may generate therefrom a power loss signal 60 to the controller 30 in the disk drive 10. As will be described below, the controller 30 may respond to the power loss signal 60 by quickly writing any buffered write commands and associated data to a temporary location on the disk 34 and then moving the transducer 20 to a park position. The park position may be, for example, on the landing zone 47 or the ramp 48 shown in FIG. 4.

The drop sensor 59 is configured to sense a condition that is indicative of that the host 50 and the associated disk drive 10 have been dropped, and can predict therefrom possible imminent contact between the transducer 20 and the disk 34. The drop sensor 59 may include, for example, one or more accelerometers that are configured to generate an indication of when the host has been dropped. In response to a sensed drop condition, the drop sensor 59 generates a drop signal 61 to the controller 30.

The power loss sensor 58 and/or the drop sensor 59 may communicate their respective signals 60,61 to the disk drive 10 while bypassing an operating system that controls operation of the host 50, and which may reside in the memory 52 and can be hosted by the CPU 51. By bypassing the host operating system, the power loss sensor 58 and the drop sensor 59 may thereby avoid communication delay that may otherwise be caused by the operating system. To bypass the operating system, the power loss sensor 58 and the drop sensor 59 may communicate with the disk drive 10 over communication paths that are separate from those used by the I/O bus 49.

As will also be described below, the controller 30 may respond to the drop signal 61 by moving the transducer 20 to the park position without completing execution of buffered write commands. The drop signal 61 and/or the power loss signal 60 are also referred to herein as a "park signal" because they cause the controller 30 to move the transducer 20 to the park position. Although the power loss sensor 58 and the drop sensor 59 have been shown in FIG. 5 and described as within the host 50 for purposes of explanation, one or both of them may be outside and independent of the host 50. For example, the power loss sensor 58 and/or the drop sensor 59 may be stand-alone sensors that are configured to provide at least some of the functionality described herein and to communicate their associated signals 60,61 through the interface 57 of the disk drive 10.

Figure 6:
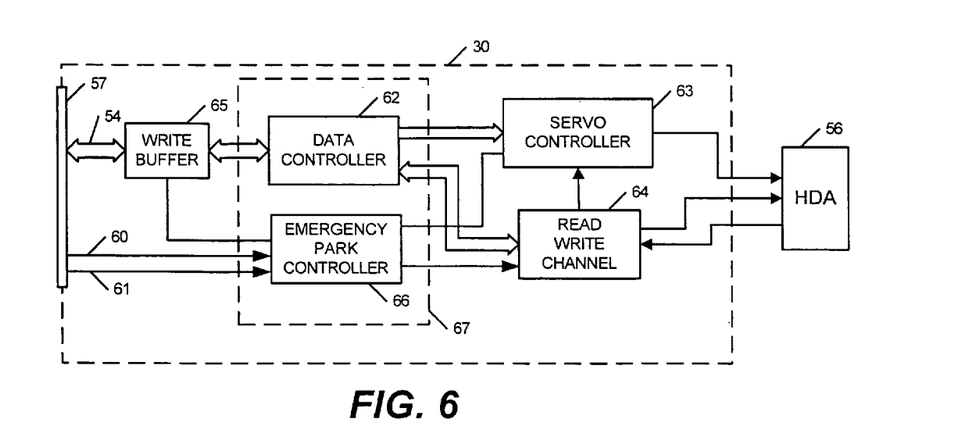
FIG. 6 is a block diagram of the controller of the disk drive shown in FIG. 5 according to some embodiments of the present invention.

Referring to FIG. 6, the controller 30 can include a data controller 62, a servo controller 63, a read/write channel 64, a write buffer 65, and an emergency park controller 66. The exemplary embodiment of the controller 30 has been illustrated with three separate controllers 62,63,66, write buffer 65, and read/write channel 64 for purposes of illustration and discussion only. It is to be understood that the functionality that is described herein for the controllers 62,63,66, write buffer 65, and/or read/write channel 64 may be consolidated in fewer components or distributed among more components. For example, the functionality that is described herein for the data controller 62 and the emergency park controller 66 may be included within an enhanced data controller 67.

A data transfer initiated by the CPU 51 to the disk drive 10 may involve, for example, a DMA transfer of data and an associated write command from the memory 52 onto the system bus 54 (FIG. 5). The data and write command from the system bus 54 are transferred by the I/O adapter 53 onto the I/O bus 49, where it is received through the interface 57 by the write buffer 65 in the disk drive 10. The data controller 62 is configured to format the data into blocks with the appropriate header information and to transfer data from the write buffer 65, via the read/write channel 64, to logical block addresses on the disk 34 that are identified by the associated write command. A plurality of write commands and associated data can be buffered in the write buffer 65 until the write commands are carried out by the data controller 62 and the associated data is written on the disk. The write buffer 65 may include, for example, a double ported memory that is configured to allow write commands and associated data from the host 50 to be added to a queue therein while the data controller 62 simultaneously accesses queued write commands and associated data in the write buffer 65.

The read/write channel 64 can operate in a conventional manner to convert data between the digital form used by the data controller 62 and the analog form used by the transducers 20. The read/write channel 64 provides servo positional information read from the HDA 56 to the servo controller 63. The servo positional information can be used to detect the location of the transducer 20 in relation to logical block addresses on the disk 34. The servo controller 63 can use address information from the data controller 62 and the servo positional information to seek the transducer 20 to an addressed track and block on the disk 34, and to maintain the transducer 20 aligned with the track while data is written/read on the disk 34. Accordingly, the data controller 62 and the servo controller 63 are collectively configured to execute write commands that are buffered in the write buffer 65 by positioning the transducer 20 relative tracks on the disk 34 while writing data from the write buffer 65 to the disk.

The power loss signal 60 and the drop signal 61 can be conducted directly from the interface 57 of the disk drive 10 to the emergency park controller 66 while bypassing the command queue in the write buffer 65. For example, the interface 57 may include a plurality of separate parallel electrical conductors. The emergency park controller 66 can receive the power loss signal 60 and/or the drop signal 61 on dedicated ones of the electrical conductors. When the interface 57 is a serial advanced technology attachment (SATA) interface, the power loss signal 60 and/or the drop signal 61 may be conducted through pin 11 of the SATA interface, which can be dedicated for use in signaling one or both of the signals 60,61. Use of pin 11 in a SATA interface for signal 60 and/or 61 may be used because it generally is not used by conventional hosts or disk drives. The power loss signal 60 and/or the drop signal 61 may alternately be communicated to the disk drive 10 via an optical and/or RF communication interface.

The controller 30 can be configured to generate an indication to the host 50 that the disk drive 10 is capable of responding to the power loss signal 60 and/or the drop signal 61. The host 50 may then respond to the capability indication from the disk drive 10 by enabling the signaling of signals 60,61 through the interface 57.

The power loss sensor 58 and the drop sensor 59 may each be connected to a different dedicated electrical conductor of the interface 57, and can thereby generate the associated power loss signal 60 and drop signal 61 by transitioning the associated conductor between logical states. Alternatively, the signals 60,61 from the power loss sensor 58 and the drop sensor 59 can be multiplexed on a single dedicated conductor in interface 57 (e.g., pin 11 of a SATA interface).

The emergency park controller 66 is configured to respond to the power loss signal 60 and/or the drop signal 61 from the host 50 by commanding the servo controller 63 to move the transducer 20 to a park position without the data controller 62 completing execution of write commands in the write buffer 65. More particularly, the emergency park controller 66 can be configured to respond to the drop signal 61 indicating that the disk drive 10 has been physically dropped by moving the transducer to the park position before data in the write buffer completes being written to the disk 34. The drop signal 61 may cause a hardware interrupt that causes operation of the emergency park controller 66 to branch to operations that cause the read/write channel 64 to stop writing data on the disk 34 and to cause the servo controller 63 to immediately move the transducer 20 to the park position without further writing of data from the write buffer 65 to the disk 34.

The emergency park controller 66 can cause the data controller 62 to resume writing of data from the write buffer 65 to the disk 34 after the drop signal 61 ceases to indicate that the disk drive 10 is being dropped and/or after the expiration of a defined time since the park signal indicated that the disk drive 10 had been dropped. The time before resumption of writing can be defined based on an expected maximum fall time after which the disk drive 10 can be expected to recover. The emergency park controller 66 may initiate a self test process that confirms the proper operation of the disk drive 10, and which may include a disk scan to check for data errors and/or bad blocks on the disk 34, before resuming writing of data to the disk 34.

Because the drop signal 61 bypasses the queued commands in the write buffer 65 and causes a hardware interrupt of the emergency park controller 66, the emergency park controller 66 can react immediately to the sensed drop and may thereby have sufficient time to reposition the transducer 20 to the parked position before the disk drive 10 is shocked by any impact from the drop. Accordingly, collision of the transducer 20 and a data storage portion of the disk 34 may be avoided. Moreover, the write commands and data that remain in the write buffer 65 after the drop has completed and/or after expiration of a defined time can be resumed so that the interruption of writing may not affect operation of the host 10.

In some embodiments, the emergency park controller 66 is configured to respond to the power loss signal 60 indicating an imminent loss of power to the disk drive 10 by causing the servo controller to move the transducer to the park position before data in the write buffer completes being written to logic block addresses identified by the associated write commands. Accordingly, the transducer 20 may be quickly moved in a controlled manner to the park position before the servo controller 20 loses its ability to control movement of the controller. Such controlled movement of the transducer 20 to the park position can avoid misplacement of the parked transducer and/or bounce back onto data storage areas of the disk 34, which may otherwise occur if movement of the transducer 20 is controlled by back EMF from the VCM 28.

In some other embodiments, in response to the power loss signal 60 indicating an imminent loss of power to the disk drive 10, the contents of the write buffer 65 are quickly stored at a temporary location on the disk and the transducer 20 is then parked. More particularly, the emergency park controller 66 can be configured to respond to the power loss signal 60 by writing data and associated write commands from the write buffer 65 to at least one temporary storage location on the disk 34 that is different from one or more logical block disk addresses that are identified by the associated write commands from the host 50. Although the write buffer 65 can contain write commands that are addressed to non-contiguous logic block disk addresses, the associated data may be written to contiguous logical block disk addresses at the temporary storage location on the disk 34. Writing the data at contiguous logical block disk addresses may be carried out more quickly than at non-contiguous logical block disk addresses where delay associated with seek operations between distant tracks may result. The contents of the write buffer 65 may thereby be more quickly stored on the disk 34 and the transducer 20 then parked before the disk drive 10 loses power.

Writing from the write buffer 65 to the temporary storage location can be carried out while blocking write command(s) from the host from being received and buffered in the write buffer 65. The emergency park controller 66 can then cause the servo controller 63 to move the transducer to the park position in a controlled manner. Accordingly, the write buffer may be retrievably saved on the disk 20 and the transducer 20 parked before the disk drive 10 loses power.

The emergency park controller 66 can reload the contents of the write buffer 65 from the temporary location on the disk and cause the data controller 62 to resume writing of data from the write buffer 65 to logical block disk addresses identified by the associated write commands from the host 50 after one or more conditions are satisfied. These conditions may include, but are not limited to, power up of the disk drive 10, expiration of a defined time since the power loss signal 60 indicated an imminent loss of power to the disk drive 10, and/or the power loss signal 60 ceasing to indicate an imminent loss of power. The emergency park controller 66 may initiate a self test process that confirms the proper operation of the disk drive 10 before resuming writing of data to the disk 34. The self test process can include, for example, a disk scan to check for data errors and/or bad blocks on the disk 34.

The power loss signal 60 may cause a hardware interrupt that causes operation of the emergency park controller 66 to branch to operations that cause the contents of the write buffer 65 to be stored at a temporary location on the disk and the transducer 20 to be parked. Because the power loss signal 60 bypasses the command queue in the write buffer 65, the emergency park controller 66 can react immediately to the sensed loss of power and may thereby have sufficient time to save the contents of the write buffer 65 to a temporary location and then to reposition the transducer 20 to the parked position before the disk drive 10 losses power. Accordingly, loss of data from the host 50 and/or collision of the transducer 20 with a data storage portion of the disk 34 can be avoided.

Figure 7:
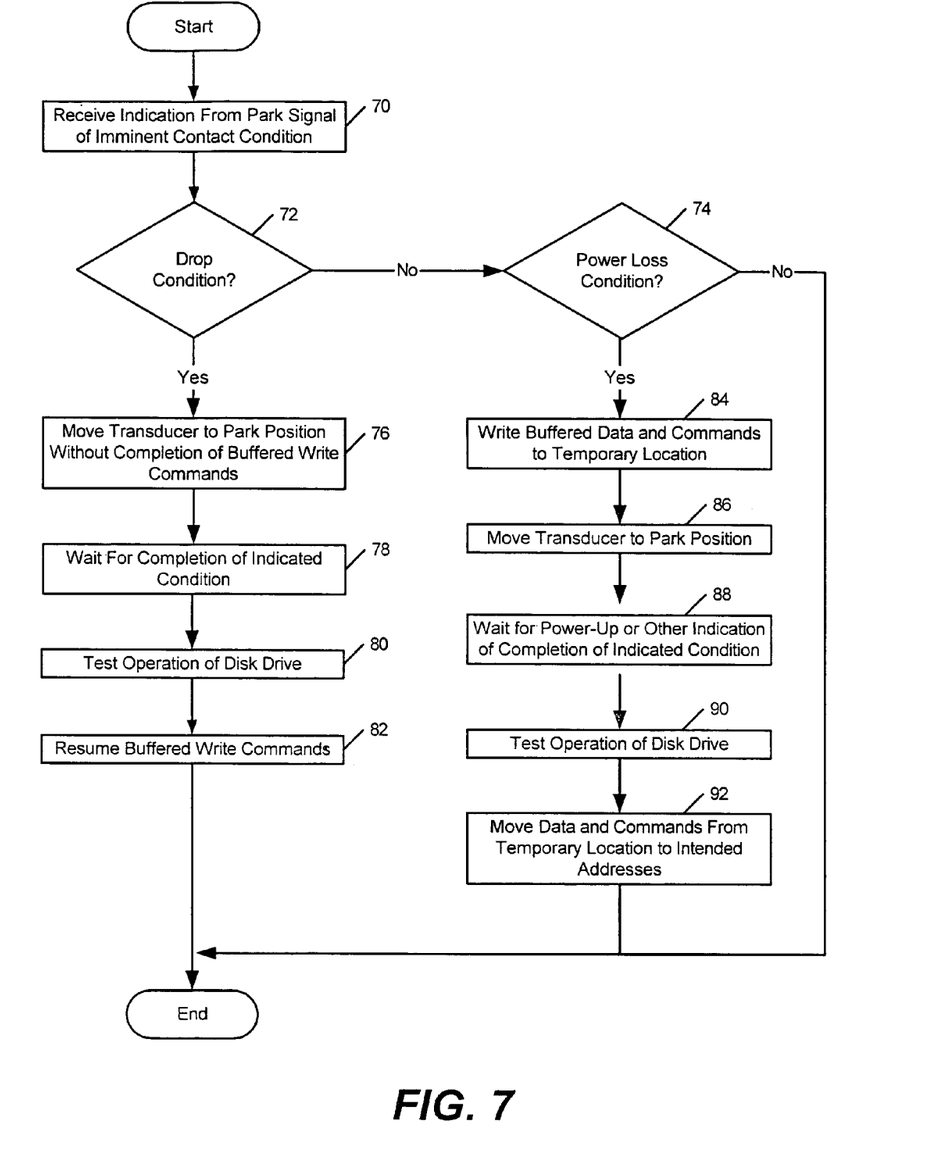
FIG. 7 is a flowchart showing operations for moving a transducer to a park position responsive to a host generated park signal that is indicative of an imminent transducer to disk contact condition, in accordance with some embodiments of the present invention.

FIG. 7 is a flowchart of a process and associated operations for moving a transducer to a park position responsive to a park signal that is indicative of an imminent transducer to disk contact condition. The operations may be carried out by the controller 30 shown in FIG. 5. At Block 70, a park signal is received that indicates a condition that can cause imminent contact between the transducer 20 and the disk 34. As explained above, the park signal can collectively include the power loss signal 60 and/or the drop signal 61. A determination is made at Block 72 as to whether the park signal is indicative of a drop condition, and if so, the transducer 20 is moved to a park position, at Block 76, without completion of buffered write commands. Further operation then waits at Block 78 for completion of the indicated condition, which may include waiting for an indication by the park signal that the drop condition no longer occurs and/or waiting for the expiration of a defined time since the occurrence of the drop condition. At Block 80, the operation of the disk drive 10 is then tested, which may include the tests described above. At Block 82, execution of the buffered write commands is resumed by the disk drive 10.

When the park signal is determined at Block 72 to not be a drop condition, then a further determination may be made at Block 74 as to whether the park signal is indicative of an imminent loss of power to the disk drive 10. When the park signal indicates an imminent loss of power, buffered data and write commands are written at Block 84 to a temporary location on the disk 34. The transducer 20 is then moved at Block 86 to the park position. Further operation then waits at Block 88 for completion of the indicated condition, which may include waiting for power-up of the disk drive 10, waiting for an indication by the park signal that the power loss condition is no longer expected, and/or waiting for the expiration of a defined time since the occurrence of the power loss condition. At Block 90, the operation of the disk drive 10 is then tested, which may include the tests described above. At Block 92, the data and commands are moved from the temporary storage location to the addresses identified by the commands.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A disk drive comprising:
   a rotatable data storage disk;
   a transducer that is configured to read and write data on the disk;
   an interface that is configured to receive data and associated write commands, and a park signal, wherein the park signal indicates an imminent loss of power to the disk drive;
   a write buffer that is configured to temporarily store the received data and associated write commands while the data waits to be written on the disk via the transducer;
   an actuator that is configured to move the transducer between a parked position and tracks on a disk where data is read and written; and
   a controller that is configured to execute the buffered write commands by positioning the transducer relative to tracks on the disk while writing data from the write buffer to the disk, and is further configured to respond to the park signal indicating an imminent loss of power to the disk drive by moving the transducer to the park position before data in the write buffer completes being written to the disk.

2. The disk drive of claim 1, wherein the park signal further indicates that the disk drive has been physically dropped, and the controller is further configured to respond to the park signal indicating that the disk drive has been physically dropped by moving the transducer to the park position before data associated with a buffered write command completes being written to the disk.

3. The disk drive of claim 2, wherein the controller is further configured to immediately cease reading and writing of data to the disk and to immediately move the transducer to the park position in response to the park signal indicating that the disk drive has been physically dropped.

4. The disk drive of claim 2, wherein the controller is further configured to resume writing data from the write buffer to the disk after the park signal ceases to indicate that the disk drive is being dropped.

5. The disk drive of claim 2, wherein the controller is further configured to resume writing data from the write buffer to the disk after expiration of a defined time since the park signal indicated that the disk drive had been physically dropped.

6. The disk drive of claim 2, wherein the controller comprises:
a data controller that is configured to carry out write commands that are queued in the write buffer by formatting data from the write buffer and writing the formatted data on the disk;
a servo controller that is configured to position the transducer relative to tracks on the disk while formatted data is written on the disk; and
an emergency park controller that is configured to respond to the park signal indicating that the disk drive has been physically dropped by causing the servo controller to move the transducer to the park position, wherein the park signal bypasses write commands queued in the write buffer.

7. The disk drive of claim 1, wherein the controller responds to an indication by the park signal of an imminent loss of power to the disk drive through a hardware interrupt that causes operation of the controller to branch to operations that move the transducer to the park position without further writing of data from the write buffer to the disk.

8. The disk drive of claim 1, wherein the controller comprises:
a servo controller that is configured to position the transducer relative to tracks on the disk while data from the write buffer is written on the disk; and
an emergency park controller that is configured to respond to the park signal indicating an imminent loss of power to the disk drive by causing the servo controller to move the transducer to the park position.

9. The disk drive of claim 8, wherein the controller further comprises:
a data controller that is configured to carry out write commands that are queued in the write buffer by formatting data from the write buffer and writing the formatted data on the disk, and wherein the park signal bypasses write commands queued in the write buffer.

10. The disk drive of claim 1, wherein the interface comprises a plurality of separate electrical connectors, wherein the controller is configured to receive the park signal on a dedicated one or more of the electrical conductors.

11. The disk drive of claim 10, wherein the interface comprises a SATA interface.

12. The disk drive of claim 11, wherein pin 11 of the SATA interface is a dedicated pin on which the controller receives the park signal from the host.

13. A disk drive comprising:
a rotatable data storage disk;
a transducer that is configured to read and write data on the disk;
an interface that is configured to receive data and associated write commands, and a park signal, wherein the park signal indicates an imminent loss of power to the disk drive;
a write buffer that is configured to temporarily store the received data and associated write commands while the data waits to be written on the disk via the transducer;
an actuator that is configured to move the transducer between a parked position and tracks on a disk where data is read and written; and
a controller that is configured to execute the buffered write commands by positioning the transducer relative to tracks on the disk while writing data from the write buffer to the disk, and is further configured to respond to the park signal indicating an imminent loss of power to the disk drive by writing data and associated write commands from the write buffer to at least one temporary storage location on the disk that is different from one or more logical block disk addresses identified by the associated write commands and while preventing another write command from being received through the interface and buffered in the write buffer, and then moving the transducer to the park position.

14. The disk drive of claim 13, wherein the controller is further configured to respond to the park signal by writing data from the write buffer, which is addressed by associated write commands for non-contiguous logical block disk addresses, to contiguous logical block disk addresses at a temporary storage location on the disk.

15. The disk drive of claim 13, wherein the controller is further configured respond to the park signal ceasing to indicate an imminent loss of power to the disk drive by moving the data from the at least one temporary storage location on the disk to the one or more logical block disk addresses identified by the associated write commands received through the interface.

16. The disk drive of claim 13, wherein the controller is further configured to respond to power-up of the disk drive by moving the data from the at least one temporary storage location on the disk to the one or more logical block disk addresses identified by the associated write commands received through the interface.

17. The disk drive of claim 13, wherein the controller responds to an indication by the park signal of imminent loss of power to the disk drive through a hardware interrupt that causes operation of the controller to branch to operations that write data from the write buffer to the at least one temporary storage location on the disk, while preventing another write command from being received through the interface and buffered in the write buffer, and then to move the transducer to the park position.

18. A disk drive comprising:
a rotatable data storage disk;
a transducer that is configured to read and write data on the disk;
an interface that is configured to receive data and associated write commands, and a park signal;
a write buffer that is configured to temporarily store the received data and associated write commands while the data waits to be written on the disk via the transducer;
an actuator that is configured to move the transducer between a parked position and tracks on a disk where data is read and written; and
a controller that is configured to execute the buffered write commands by positioning the transducer relative to tracks on the disk while writing data from the write buffer to the disk, is configured to respond to the park signal, which is indicative of an imminent transducer to disk contact condition, by moving the transducer to the park position without completing execution of the buffered write commands, and is configured to generate an indication to a host, which is connected thereto via the interface, that the disk drive is capable of responding to the park signal by moving the transducer to the park position without completing execution of write commands in the write buffer.

19. The disk drive of claim 18, further comprising a ramp that prevents contact between the transducer and the disk when the transducer is parked on the ramp, and wherein the controller is configured to move the transducer to the park position on the ramp in response to the park signal.

20. The disk drive of claim 18, wherein the disk defines a landing zone on which the transducer can be parked and on which data is not written by the transducer, and wherein the controller is configured to move the transducer to the park position on the landing zone in response to the park signal.

21. A host comprising:
an interface that is configured to be communicatively coupled to a disk drive;
a central processing unit that is configured to communicate data and associated write commands via a first path through the interface to a coupled disk drive to cause the data to be written through a transducer onto a disk in the disk drive; and
a power loss sensor that is configured to determine when a condition of imminent loss of power to the disk drive occurs, and responsive thereto to generate a park signal which is communicated via a second path through the interface to the disk drive to cause the disk drive to move the transducer to a park position.

22. The host of claim 21, wherein:
the interface comprises a plurality of separate electrical conductors that carry signals between the host and the disk drive; and
the sensor communicates the park signal through a dedicated one or more of the electrical conductors of the interface to the disk drive.

23. A host comprising:
an interface that is configured to be communicatively coupled to a disk drive;
a central processing unit that is configured to communicate data and associated write commands via a first path through the interface to a coupled disk drive to cause the data to be written through a transducer onto a disk in the disk drive;
an operating system; and
a sensor that is configured to sense a condition that may cause imminent contact between the transducer and the disk in the disk drive, and to generate a park signal that is indicative of the sensed condition and which is communicated via a second path through the interface to the disk drive to cause the disk drive to move the transducer to a park position,
the sensor bypasses the operating system when it communicates the park signal through the interface to the disk drive.

24. A circuit comprising:
a controller that responds to a park signal, which is received from a host device and is indicative of imminent loss of power to a disk drive that includes the controller, by writing data and associated write commands, which originated from the host device, from a write buffer of the disk drive through a transducer of the disk drive to at least one temporary storage location on a disk of the disk drive that is different from one or more logical block disk addresses identified by the associated write commands, and then moving the transducer to a park position relative to the disk.

* * * * *